No. 890,888. PATENTED JUNE 16, 1908.
F. S. BALDWIN.
CALCULATING AND RECORDING MACHINE.
APPLICATION FILED JAN. 24, 1907.

7 SHEETS—SHEET 1.

Witnesses
Jno Imire
C. P. Wright, Jr.

Inventor
F. S. Baldwin,
By A. S. Pattison,
Attorney

No. 890,888.
PATENTED JUNE 16, 1908.
F. S. BALDWIN.
CALCULATING AND RECORDING MACHINE.
APPLICATION FILED JAN. 24, 1907.
7 SHEETS—SHEET 2.
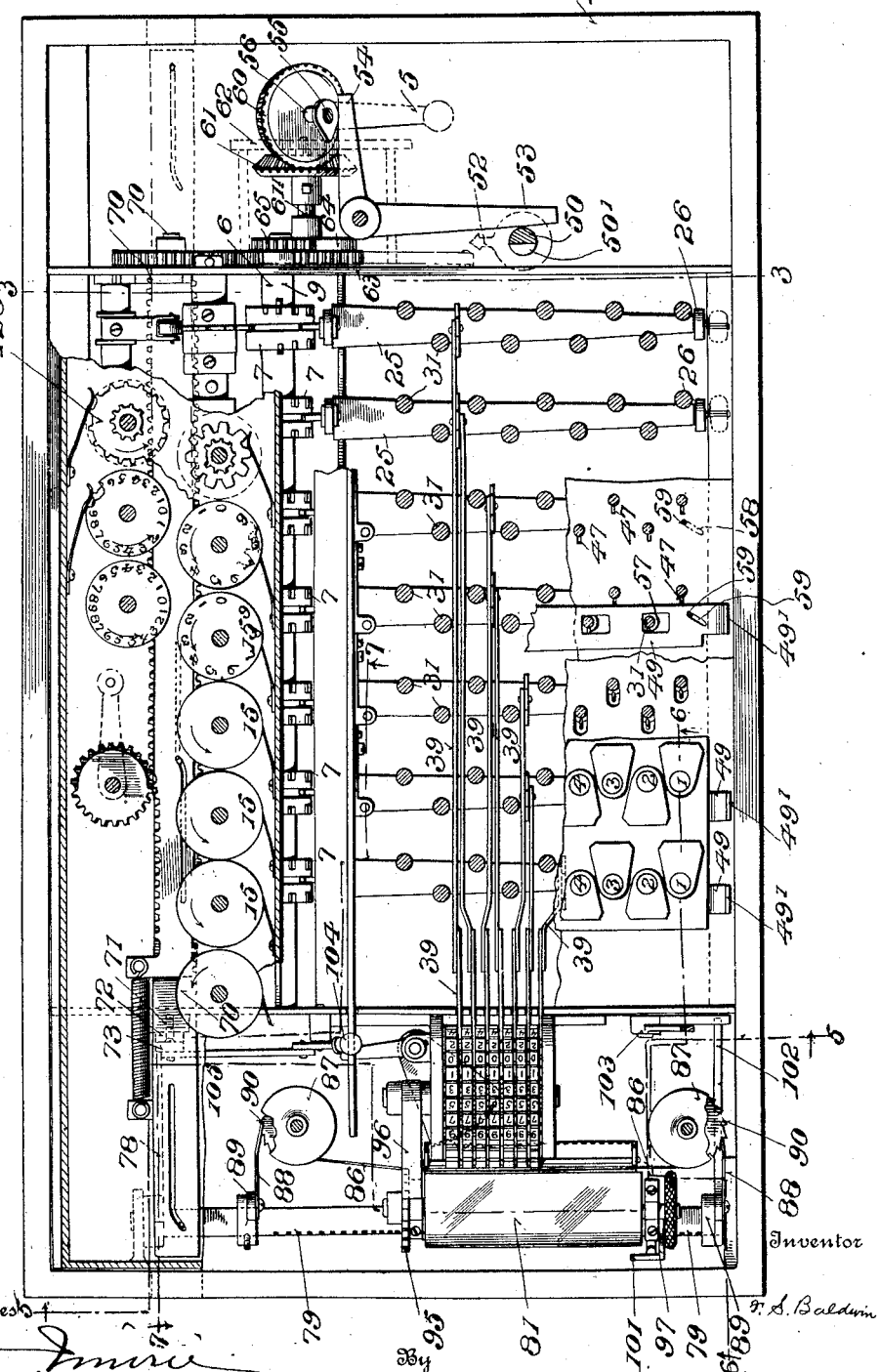

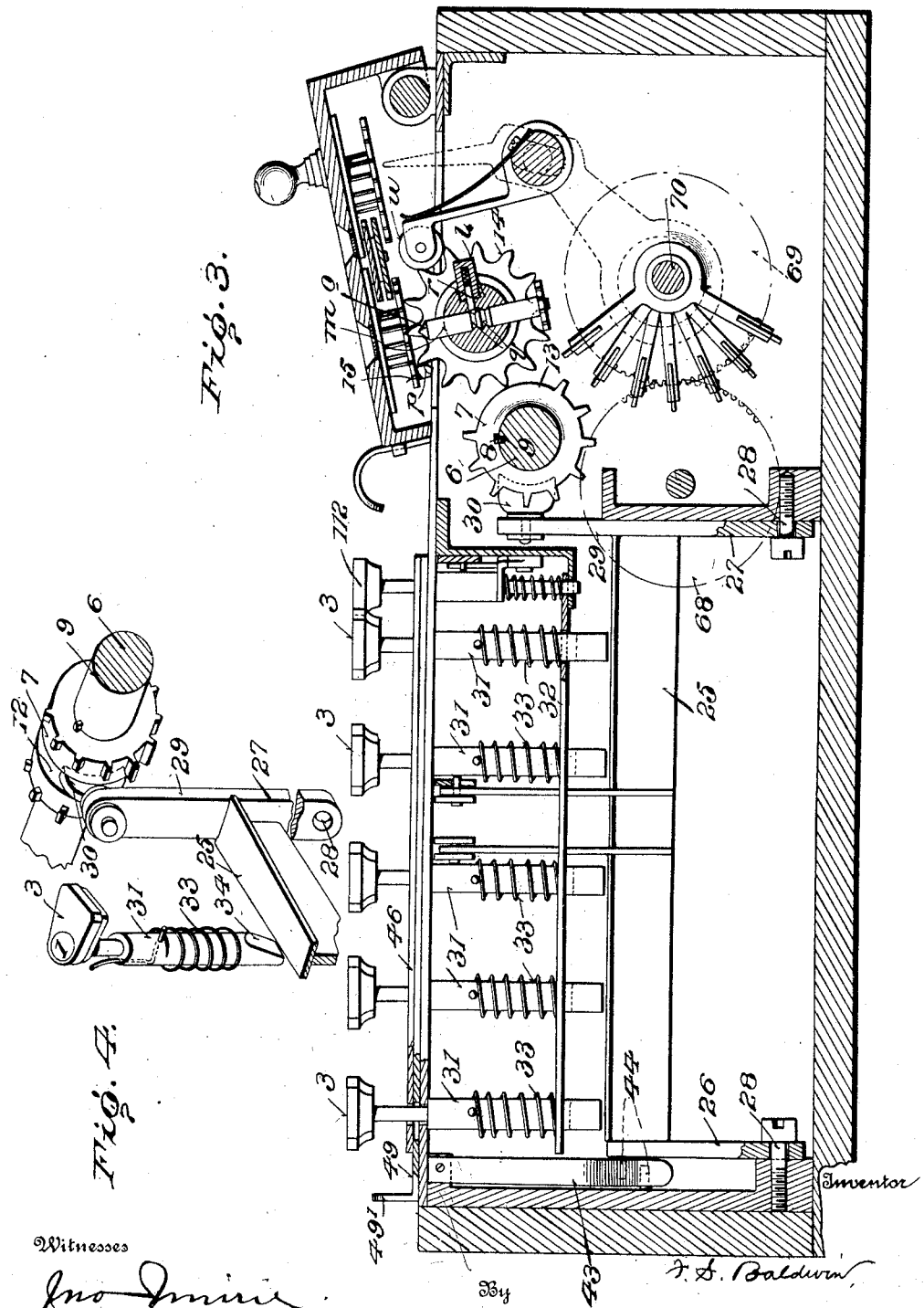

No. 890,888. PATENTED JUNE 16, 1908.
F. S. BALDWIN.
CALCULATING AND RECORDING MACHINE.
APPLICATION FILED JAN. 24, 1907.

7 SHEETS—SHEET 4.

Witnesses
Inventor
F. S. Baldwin,
By A. S. Pattison,
Attorney

No. 890,888. PATENTED JUNE 16, 1908.
F. S. BALDWIN.
CALCULATING AND RECORDING MACHINE.
APPLICATION FILED JAN. 24, 1907.

7 SHEETS—SHEET 5.

Witnesses
Jno Imirie
H. R. Wright Jr.

Inventor
F. S. Baldwin,
A. S. Pattison
By
Attorney

No. 890,888.　PATENTED JUNE 16, 1908.
F. S. BALDWIN.
CALCULATING AND RECORDING MACHINE.
APPLICATION FILED JAN. 24, 1907.

7 SHEETS—SHEET 6.

Witnesses
Inventor
F. S. Baldwin
Attorney

No. 890,888. PATENTED JUNE 16, 1908.
F. S. BALDWIN.
CALCULATING AND RECORDING MACHINE.
APPLICATION FILED JAN. 24, 1907.
7 SHEETS—SHEET 7.
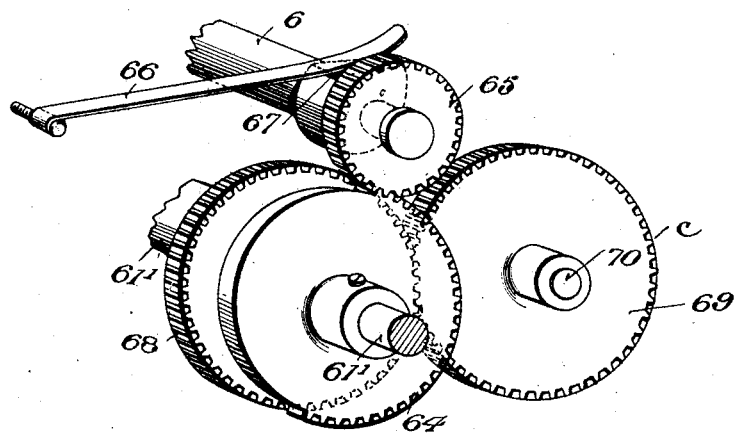
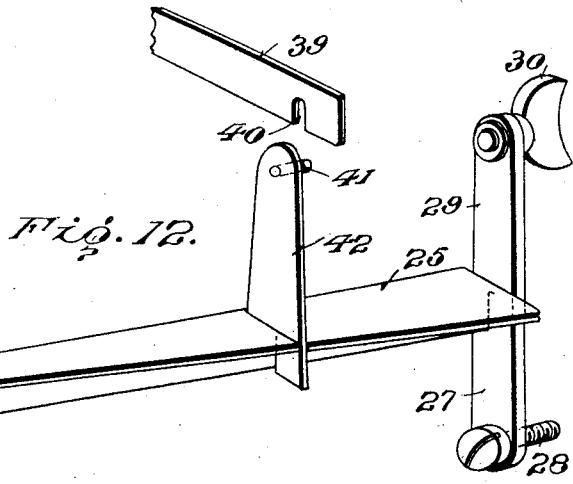
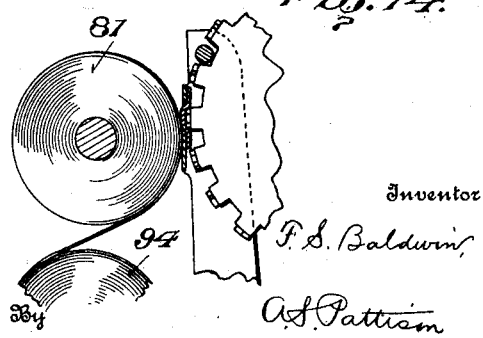
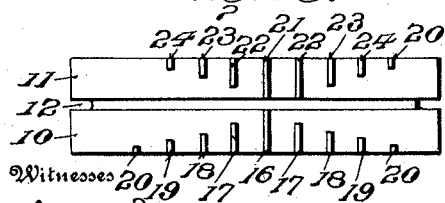
Inventor
F. S. Baldwin,
Witnesses
By A. S. Pattison
Attorney
THE NORRIS PETERS CO., WASHINGTON, D. C.

UNITED STATES PATENT OFFICE.

FRANK S. BALDWIN, OF BROOKLYN, NEW YORK.

CALCULATING AND RECORDING MACHINE.

No. 890,888.   Specification of Letters Patent.   Patented June 16, 1908.

Application filed January 24, 1907. Serial No. 353,863.

*To all whom it may concern:*

Be it known that I, FRANK S. BALDWIN, a citizen of the United States, residing at Brooklyn, in the county of Kings and State of New York, have invented certain new and useful Improvements in Calculating and Recording Machines, of which the following is a specification, reference being had therein to the accompanying drawing.

My invention relates to improvements in calculating and recording machines, the object of which is to provide an improved mechanism for the rapid solution of problems involved in addition, subtraction, multiplication and division calculations, and to record the results upon a roll or sheet of paper for convenient reference and record.

Figure 1:
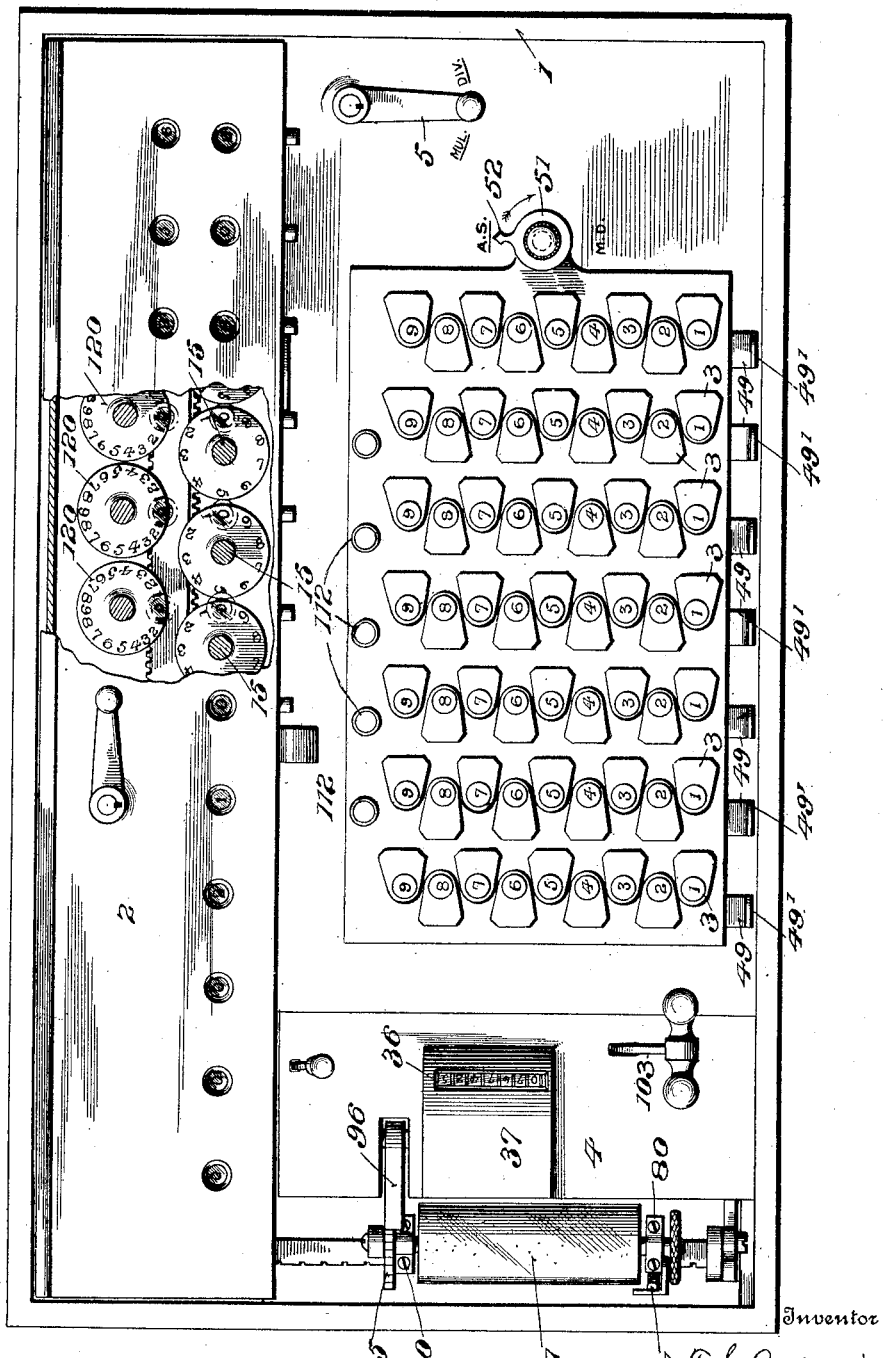
Figure 5:
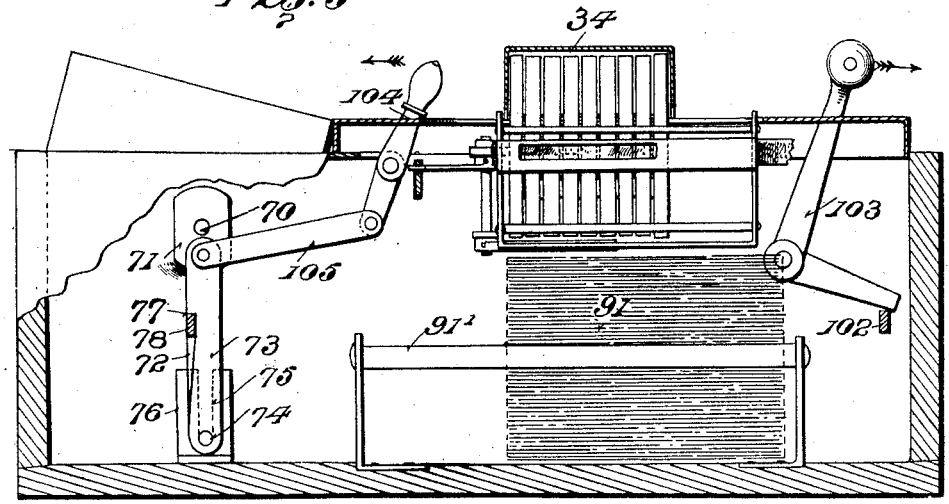
Figure 6:
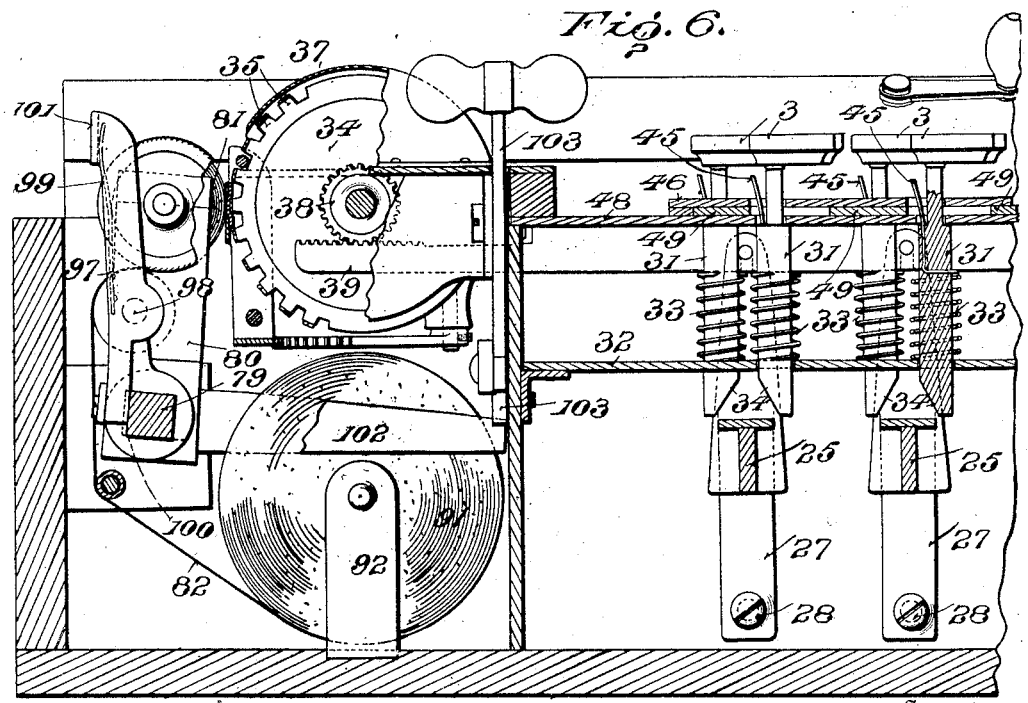
Figure 7:
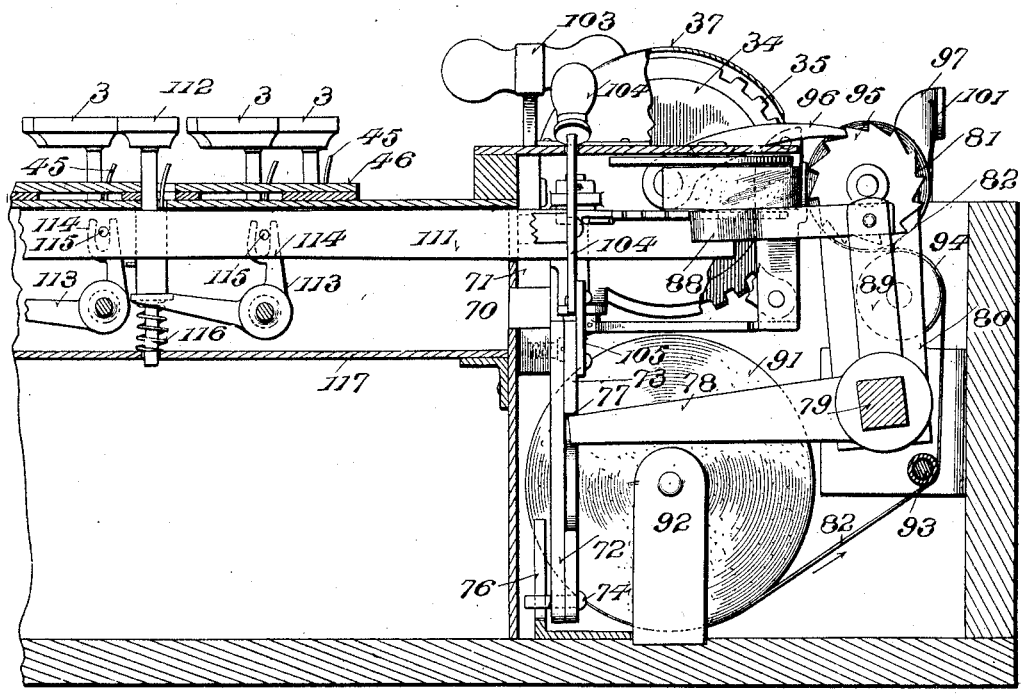
Figure 15:
Figure 9:
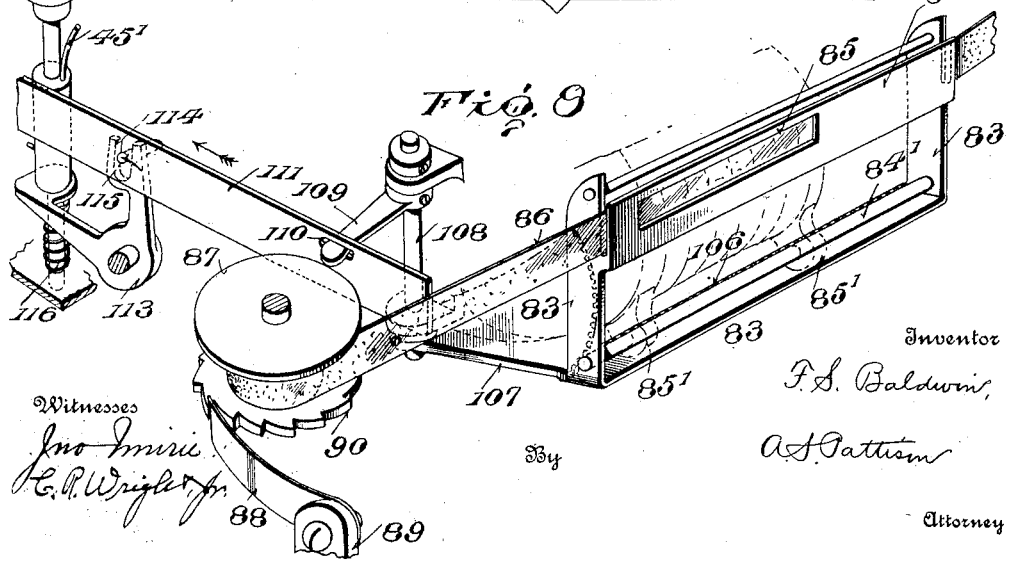
Figure 9:
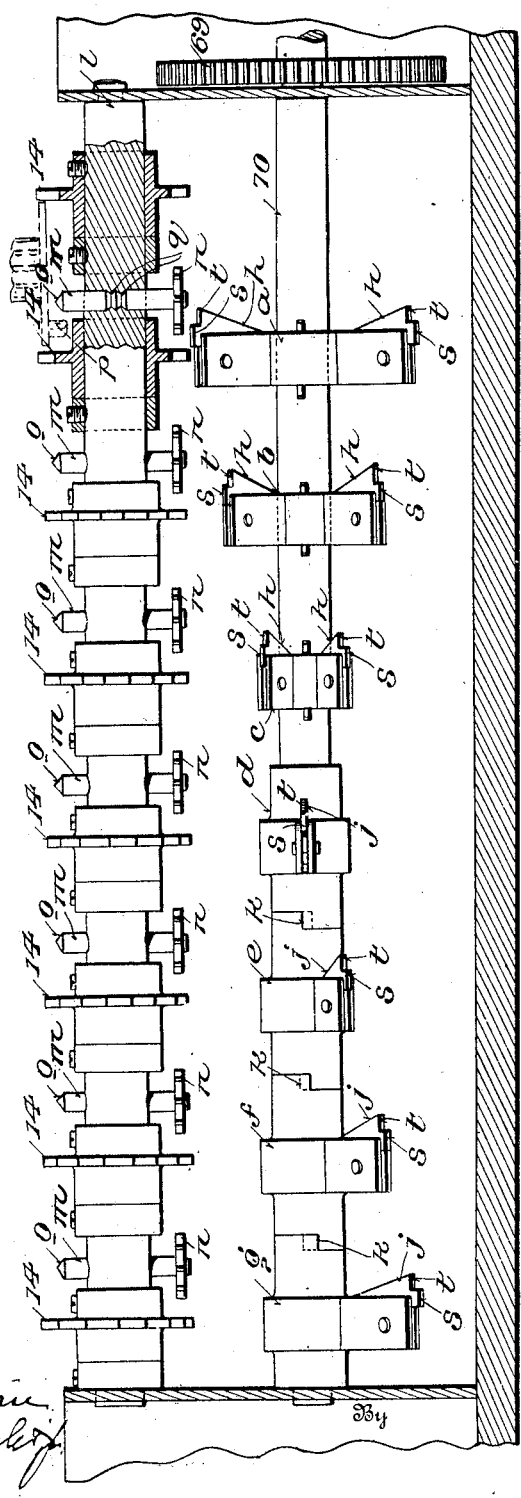
Figure 10:
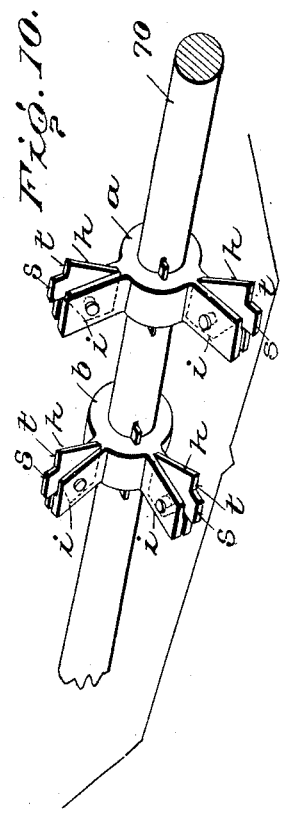

In the accompanying drawings, Figure 1, is a top plan view, partly in section, of a combined calculating and recording machine which involves my present invention. Fig. 2, is a top plan view of my improved machine with the cover almost wholly removed, showing in full and in dotted lines the arrangement and relative positions of my improved mechanism. Fig. 3, is a vertical transverse sectional view on the line 3—3 of Fig. 2. Fig. 4, is a detached perspective view of one of the keys and its coöperating parts for effecting the transverse shifting of its primary calculating wheel or gear. Fig. 5, is a transverse vertical sectional view on the line 5—5 of Fig. 2. Fig. 6, is a sectional view on the line 6—6 of Fig. 2. Fig. 7, is a sectional view on the line 7—7 of Fig. 2. Fig. 8, is an enlarged detached perspective view of the mechanism for shifting the printing guard. Fig. 9, is a detached side view of the carrying mechanism for the registering mechanism. Fig. 10, is a detached perspective view of a portion of the shaft which carries the pivoted dogs of the carrying mechanism. Fig. 11, is a detached perspective view of the actuating gears. Fig. 12 is a detached perspective view of the rocking bar which is actuated by the keys, and its coöperating link or lever which shifts the primary calculating gear or wheel. Fig. 13, is a diagrammatic view of the toothed surfaces of the primary calculating wheels or gears. Fig. 14, is a detached sectional view showing the printing guard, a portion of the recording or printing wheels and the impression roller. Fig. 15, is a diagrammatic view showing the arrangement of the series of levers 113 for moving the ribbon-holding frame various distances.

In carrying out my present invention, a suitable inclosing case 1 is provided, and this case is preferably rectangular, as shown in Figs. 1 and 2. The registering mechanism is located within a movable carriage 2 located at one side of the case or frame, and this carriage is capable of an endwise movement for a purpose to be explained hereinafter. Located at the opposite side of the case or frame are the series of keys, by means of which the mechanism is set for the desired calculation. Located at the end of the frame or case, and in a line with the series of keys, is the recording and printing mechanism 4. The operating lever 5 by means of which the registering of the set up figures both upon the registering and recording or printing mechanism, and for effecting the printing, is located at the right hand end of the machine, and approximately at the center thereof, as shown in Fig. 1.

*Registering mechanism.*—I will first describe in detail the primary calculating wheels or gears of the registering mechanism and its coöperation with the registering gears or wheels, and will then describe the mechanism for setting these primary calculating wheels or gears by means of the key-actuating mechanism.

Referring now particularly to Figs. 2 and 3, a shaft 6 passes longitudinally through the machine, and is suitably journaled and supported in any desired and convenient frame. Keyed to the shaft 6 are a plurality of primary calculating gears 7, so that they revolve with the shaft, but the key 8 fits loosely in the groove 9 of the shaft 6, so that these wheels 7 may be moved laterally upon the shaft in opposite directions, the purpose of which will be explained presently. By reference to Fig. 2, and to the diagrammatic view 13 of these primary gears 7, attention is directed to the fact that these gears each consist of the two toothed portions 10 and 11, and that there is a circumferential groove 12 dividing these two toothed portions. These primary calculating wheels or gears 7 are provided with an untoothed portion 13, as shown in Fig. 3, and they are adapted to coöperate with the intermediate gears 14, and these gears 14 in turn mesh with and operate the numeral wheels 15 of the registering mechanism.

Turning now to the specific construction of the toothed portions of the primary gears 7, reference is made to Fig. 13. As shown in this figure, the teeth on the portions 10 and 11 are made of various widths. On the portion 10 the center tooth 16 extends practically to the groove 12; the teeth 17 located at opposite sides thereof are made shorter, but of corresponding widths; the next teeth 19 are made of corresponding widths but narrower than the teeth 18, and the next teeth 20 are made of corresponding widths but narrower than the teeth 19.

By reference to Fig. 2, in which the primary gear 7 is shown in its normal position, it will be seen that the intermediate gear 14 is in line with the groove 12 of the gear 7, so that a rotation of the gear 7 does not bring any of its teeth in engagement with the intermediate gear 14, and therefore does not, when in this normal position, operate or have any effect upon the intermediate gear 14. On the other hand, however, if the gear 7 is moved to the left in Fig. 1, a slight distance the center tooth 16 will be brought in line to engage the intermediate gear 14, so that a complete revolution of the gear 7 will move the gear 14 one tooth; if the gear 7 is moved sufficiently far to the left to just bring the teeth 17 in line with the gear 14, a complete revolution of the gear 7 will turn the gear 14 three teeth; if the gear 7 is moved still further to the left, to bring the teeth 18 in line with the gear 14, then there will be five teeth of the gear 7 engage the gear 14; a further movement of the gear 7 to the left to bring the teeth 19 in line with the gear 14, there will be seven teeth engage the gear 14, and a movement of the gear 7 to the extreme left will bring the teeth 20 in line with the gear 14 and there will be nine teeth engage this latter gear. The portion 11 of this gear 7 carries eight teeth, the two center ones 21 of which extend practically to the grooved portion 12, the next teeth 22 are made narrower, the next 23 are made still narrower, and the next teeth 24 narrower than the teeth 23. From this it will be noted that a movement of the gear 7 to the right will first bring the two teeth 21, next the teeth 22, next the teeth 23, and next the teeth 24, and thus the gear 7 be made to rotate the gear 14 either two, four, six or eight, according to the lateral adjustment of the wheel 7 to the right. By means of the right and left adjustment of these primary gear wheels 7, they can be made to rotate the gears 14 from 1 to 9 teeth, and in turn these gears 14 rotate the numeral wheels 15 the corresponding number of teeth.

*Key operating mechanism.*—The lateral adjustment of the primary calculating wheels or gears 7 is effected by the keys 3. These keys, as shown in Fig. 1, are arranged in parallel series or banks, and as here shown, there are seven banks or series, though there may be more or less than this number of key banks without affecting in any manner the present invention. By reference to Fig. 2, it will be seen that there is a primary calculating gear 7 for each one of the key banks or series. These key banks or series each have the keys alternately arranged on opposite sides of a central line, the keys on one side representing the numerals 1, 3, 5, 7, and 9, and the keys on the opposite side representing the numerals 2, 4, 6, and 8. Located below each of these series or banks of keys is a bar 25, and this bar is carried by two depending links 26 and 27 pivoted at their lower end at the points 28 in any suitable manner, but preferably by screws, as here shown. Projecting upward from the inner ends of these bars 25 are the arms 29, and these arms 29 are each provided with a yoke 30 which extends into the groove 12 of its respective primary gear 7. As here shown, the arm 29 is preferably a continuation of the link 27, though it may be made separate therefrom without departing from the invention, or in any manner affecting the operation of the parts. By reference to Fig. 6, it will be noted that the bars 25 are preferably T-shaped in cross-section.

The lower stem portions 31 of the keys 3 pass through a suitable guiding plate 32, which guiding plate is located above the swinging bars 25, and passing around these stem portions are suitable spiral springs 33 which have their upper ends secured to the stem and their lower ends resting upon the guide plate 32, whereby the keys are normally held in an upward position. The lower ends of the stem portions 31 are beveled, as shown at 34, for the purpose of engaging the horizontal flanges of the T-shaped bars 25. As shown in Fig. 6, the stems of alternate keys of each bank are beveled on opposite sides, so as to engage opposite sides of the bar 25. When the key at one side of the bank is depressed, the bar 25 is rocked in one direction, and when the key at the opposite side of the same bank is depressed, the bar 25 is rocked in the opposite direction.

By reference to Fig. 1, it will be seen that the numerals on the keys of each bank run from the outer to the inner side; or in other words, run inwardly, the key 1 being placed at the outer end of the bank. The depression of the key 1 will cause the bar 25 to move to the left just far enough to move the gear 7 by means of the arm 29 and yoke 30 to bring the one tooth 16 in line with the intermediate wheel 14; the depression of the key carrying the numeral 2 will cause the bar 25 to rock to the right just far enough to bring the two teeth 21 of the gear 7 in line with the gear 14, the respective keys from 1 to 9 effecting the rocking movement of the bar 25 in the proper direction to bring the number of teeth on the wheel 7 in line with the wheel 14, which is represented by the numeral of that key, and in this way each key sets the wheel 7 in the proper position to cause the registering mechanism to move the proper number of teeth in line with the gear 14 to register the number on the registering mechanism which is represented by the respective key that is operated.

The distance which the bar 25 is caused to rock is effected by the tapering of these bars from their inner to their outer end, as shown in Fig. 4, whereby the tapered ends of the respective keys are caused to engage the rocking bar 25 earlier or later in its downward movement; in other words, by this means the respective keys are permitted to pass the required amount of vertical movement before engaging the rocking bar, as may be necessary to have its tapered portion move the rocking bar the proper distance. For instance, the key with the numeral 1 will almost complete its downward movement before its tapered portion engages the rocking bar, and in this way the key 1 is made to move the rocking bar only a very slight distance, and by the tapered portion of the rocking bar each key from 1 to 9 is thus caused to move the bar an increased distance, and thus move the calculating wheel 7 laterally the proper distance to bring the correct number of teeth in line with the intermediate gear 14.

In order to print the amount or number set up, it is necessary that the mechanism be held in its set up condition while the printing is effected. In my improved machine, the registering mechanism is independent of the recording or printing mechanism, though the keys which set up the registering mechanism also set up the recording mechanism, and I will now describe the recording mechanism and the means for setting it up, and will then describe the mechanism for holding the recording mechanism set during the printing operation, and the means for releasing the recording mechanism, and causing it to return to zero, or in other words, to wipe out the set up numerals on the recording mechanism.

*Printing or recording mechanism.*—The printing or recording mechanism consists of a plurality of wheels 34, each of which is provided with a series of ten printing projections 35 carrying the numerals 1 to 0, which are located on one side of the center of their peripheries, and a corresponding series of numerals on the other side of their peripheries, which numerals show through the slot 36 of a covering 37 for the printing wheels, and these numerals are so placed and so arranged upon the printing wheels that the number corresponding with the number to be printed will show through the said slot, and the operator can thus see the numbers that have been set up and that are to be printed before they are actually printed, and as will hereinafter be explained, any desired correction can be made before the printing operation takes place. Each of these printing wheels 34 is provided with a pinion 38 (Fig. 6) and a reciprocating rack bar 39 is provided for each of these printing wheels. These wheels are independent of each other, and are actuated independently by their respective rack and pinion 38 and 39.

As is well understood by those skilled in this art, these numeral wheels from right to left represent respectively units, tens, thousands, tens of thousands, etc., and any desired number of these printing wheels may be provided, but as here shown, there should be and there is one printing wheel for each bank or series of keys. The respective banks or series of keys represent the units, tens, hundreds, thousands, etc., reading from right to left of Fig. 1. That is to say, the right hand series represents the units, the next series the tens, the next the hundreds, and so on throughout the succeeding series or banks of keys.

There are seven printing wheels and seven banks or series of keys. The rack bar 39 is connected with the units bank or series of keys which is the right-hand bank of Fig. 1. This connection is accomplished by running the rack bar thereof to the rocking bar 25 of that series of keys, and the rack bar is provided with a notch 40 that receives a pin 41 upon the upper end of an arm 42, which arm 42 is rigidly connected with the rock bar 25. Each of the other rack bars 39 is similarly connected with the respective rock bar of its respective series or bank of keys, as shown in Fig. 2. When the rock bar 25 is moved by the depression of a key, it rotates its respective printing wheel the proper distance to bring the number to the printing point which corresponds with the number which the depressed key represents, and at the same time the rock bar effects the setting up of the primary calculating wheel 7 in the manner previously described. Each of the rock bars 25 is held in its normal neutral or inoperative position by means of two flat springs 43 which engage opposite sides of the two pins 44 one of which projects from the link 26, and the other from the inner side of the frame or case. These springs and pins serve to return the rock bar to its neutral position and to hold it there.

I will now explain the means for holding the printing wheels in their set positions until the printing is effected, and this same means serves to hold the primary calculating wheels in their set positions until the set up numerals have been carried or transferred to the registering mechanism. It consists in providing the key stems at their upper portions with upwardly and outwardly extending springs 45 which, when the keys are depressed, spring outward under a top movable plate 46. These springs also play in slots 47 (Fig. 2) of a plate 48, and thus serve to hold the keys against rotation, so that the inclined portions 34 will always be in proper position to engage the rock bar 25. Located between the plates 46 and 48 are a series of endwise-moving plates 49, one for each bank or series of keys, the object of which will be presently explained. It will thus be understood that when a key is depressed it is held in this depressed position by means of its spring 45, and while thus held the numerals which have been set up, both in the printing and registering mechanism, are held for printing and transference to the registering mechanism. Connected with the top plate 46 is a rod or stud 50 which has an operating head 51 and a pointer 52. With the pointer in the position shown in Figs. 1 and 2 the plate 46 is adapted to be moved endwise by the engagement with the bar 50 of the arm 53 of a bell-crank lever, the other arm 54 of the lever being operated by means of a cam 55 located upon an inclined operating shaft 56, to the upper end of which is connected the operating handle 5. When the arm 53 is moved against the bar or stud 50, the plate 46 is moved endwise from over the upper ends of the springs 45 of any depressed keys, and the keys are released and thrown back to their normal positions by their springs 33, and the rock bars 25 are returned to their normal position and which returns the wheels 7 and printing wheels 34 to their original position.

The object of the individual bars 49 is to enable any particular series of keys to be released without releasing all of them, which latter result is accomplished when the plate 46 is moved. These bars 49 are provided with openings 57 through which the stems 31 of the keys pass, and these openings are elongated to permit an endwise movement of the bars, and are of sufficient width not to interfere with the action of the holding springs 45 when in their normal positions. The bars are provided at each end with a diagonal slot 58 through which stationary pins 59 pass, so that when the bar 49 is pushed inward it is moved laterally and releases the springs 45 of the depressed keys by forcing the ends of the springs from under the plate 46. As shown in Fig. 2, the wall of the slot serves to force the springs of the stems which pass through the slots 57 from under the plate 46, and the right hand edge (Fig. 2) of the bar 49 engages the springs 45 of the alternate key stems, and will force any of them laterally which happen to be under the plate 46, and thus release the keys, and permit them to return to their original position which, as previously stated, wipes out the set up numbers on the printing wheels and returns or wipes out the adjusted positions of the primary calculating wheels 7, and hence the plate 46 may be aptly termed a universal holding and wiping out plate, and the bars 49 may be aptly termed individual wiping out members or bars. These individual bars are operated by means of upwardly-extending finger pieces 49' located at the outer ends of the said bars 49. The object of these individual wiping out bars is that after a series of numbers have been set up on the respective printing wheels, and primary calculating wheels 7, and it is found that one of the numbers is wrong, by observing them through the opening 36 of the printing mechanism, and before the printing and calculating operations have been completed, the number on the wheel which was wrong can be wiped out by the individual bar without disturbing the other wheels, and the correct number set up in its place, which prevents the necessity of resetting the whole series of numerals, which would be necessary if the universal wiping out plate 46 were used. If at any time it is desired to wipe out all of the numbers set up, it can be done independently of the arm 53, and hence independently of the bell-crank lever and its operating mechanism, by simply pushing to the left upon the head 51 of the stud 50, which will move the universal wiping out plate, as previously stated.

*Printing and registering operating mechanism.*—The means for operating the printing mechanism and the registering mechanism after they have been set up is effected by an operating handle 5 which is secured to the shaft 56, both of which have been previously mentioned. Carried by the shaft 56 is a beveled gear 60, and this beveled gear 60 is in mesh with the beveled gear 61. The latter gear is fast to a shaft 61' which is journaled in one end of a frame 62, and in the side 63 of the main frame for the mechanism previously described. Reference is made particularly in this description to Figs. 2 and 11. Carried by and secured to the shaft 61' is a segmental gear 64 which has only one-half of its periphery provided with teeth, of which there are 24 in number, as shown in Fig. 11. These teeth are adapted to mesh with a gear 65 which also has twenty-four teeth, so that the gear 64 by a half revolution will cause a complete revolution of the gear 65. This gear 65 is made fast to the shaft 6 which carries the primary calculating wheels 7 previously described. A flat spring 66 engages a flat portion 67 upon a collar of the gear 65, or this flat portion may be made directly in the shaft. The object of this flat portion and the spring is to hold the shaft 6, and thereby the primary calculating wheels 7, always in their proper normal positions. That is to say, as soon as the shaft 6 has been given a complete revolution by the half revolution of the gear 64, the flat portion and the spring act to catch the shaft as soon as the gear 65 is out of engagement with the gear 64, and will hold the shaft from being thrown by its normal position, and always cause it to be maintained in its proper position for the engagement of the gear 64, and always hold the primary calculating gears 7 in their proper position to be set by the key mechanism, as previously explained. Also secured to the short shaft 61' is a complete gear 68, and this complete gear meshes with a complete gear 69, and these two gears 68 and 69 each have forty-two teeth, so that the shaft 70 to which the gear 69 is secured makes a complete revolution for every revolution of the gears 68. The shaft 70 extends to the other end of the machine and has secured to it a crank-arm 71 to which a pitman 72 (Figs. 5 and 7) is pivoted. Pivoted to the lower end of this pitman is a link 73, and the pin 74 connecting the link and the pitman, passes into a slot 75 of a bracket 76, whereby the lower end of the pitman, or rather, the pin 74 is caused to travel in a vertical plane, and carries with it the link 73. This link 73 is provided with a shoulder 77 that engages the outer end of an arm 78 (Fig. 7) which projects from a square or angular shaft 79. Placed upon this angular shaft 79 is a frame 80 in which is journaled a rotatable printing roll 81, so that when the shaft 79 is oscillated by depressing the outer end of the arm 78, the printing roll is carried against the printing projections of the printing wheels 34.

I will now explain how the set up numerals of the primary calculating wheels 7 are carried into the registering mechanism, and how the printing is effected, and the universal wiping out of the set up figures by the operation, or rather, a single rotation of the operating handle 5.

In Fig. 1, the neutral position of the operating handle 5 is shown. Assuming that some of the keys have been depressed, and some of the primary wheels adjusted, and the printing wheels set up in the manner previously described, the handle 5 being turned to the left will cause a complete revolution of the shaft 6 in a half revolution of the handle 5, since the half revolution of the handle 5 will cause a half revolution of the shaft 61' which carries the gear 64, and this, as previously stated, causes the complete revolution of the shaft 6. The complete revolution of the shaft 6 causes the set up teeth of the wheels 7 (the number of teeth corresponding to the set up numbers, as previously set forth) to engage the intermediate gears 14, and these gears in turn transfer the numbers to the numeral or registering wheels 15. At the same time the shaft 70 causes the pitman 72 to travel down and the shoulder 77 of the link 73 being in engagement with the arm 78, depresses the arm and causes the oscillation of the shaft 79 and thereby the impression or printing roller 81 to cause the impression upon the paper 82 which passes between the printing roll and the printing wheels. A printing ribbon is used and this will be explained presently. After the printing is effected, which is before the complete revolution of the operating handle 5 is effected, and just prior to the engagement of the cam 55 with the arm 54 of the bell-crank lever. The engagement of the cam 55 with the arm 54 of the bell-crank lever just as the revolution of the handle 5 is completed, causes the arm 53 to engage the stud 50 and thereby force the universal wiping out plate endwise and to release all of the depressed keys and permit the operating mechanism to return to its neutral or normal position, so that the setting up mechanism is ready for the next item or set of numerals that is to be added.

A ribbon-holding frame 83 is provided, and this frame has a thin plate 84 provided with a slot 85. The ribbon 86 passes between this plate 84 and the printing wheels, and the paper 82 passes between the printing roller 81 and the slotted plate 84. The feeding of the ribbon is effected by rotating the spools 87 around which the ribbon passes, and this rotation is produced by the pawls 88 which are secured to the upper ends of arms 89 which extend upward from the shaft 79. In order to permit one spool to be rotated for feeding the ribbon in one direction while the other spool is inoperative, the pawls 88 can be respectively lifted or raised out of engagement with the coöperating ratchet wheel 90.

The paper roller 91 is journaled in a suitable frame 92, and passes from the roll and over a rod 93 over a roll 94 and thence around the printing roll, the roll 94 and printing roll being in engagement to effect the pulling of the paper from its roll.

From the foregoing, it will be observed that the reciprocation of the shaft 79 effects the printing by carrying the impression or printing roller to the printing wheels; causes the ratchet wheel 95 to engage the pawl 96 and rotate the roller 81 to feed the paper one space so that the printed figures will be arranged in a vertical column, and also effects the feeding of the ribbon.

When it is desired to print the same set up number more than once (such, for instance, as printing or recording two or more checks of the same amount) or when it is desired to register the same number several times, (for instance, when multiplying), it is desirable that the set up amount or numbers should not be wiped out by the printing and registering operation until the desired duplication or repetition is printed and registered, or if only multiplying until the desired number has been repeated, as may be required for the calculation. To prevent the wiping out of the set up amount or number, the stud 50 is rotated, and is provided at one side with a cut out portion 50', so that when the stud is turned around to bring the cut out portion opposite the arm 53, the arm is permitted to travel in this cut out portion without effecting any movement of the wiping out plate 46, and the set up members can in this way be permitted to remain for any desired number of repetitions without being disturbed.

The frame 80 which carries the impression or printing roller 81 is longitudinally movable on the shaft 79, and as shown in Fig. 1, this printing roller is longer than the space occupied by the printing wheels 34, so that a line of figures may be printed longer than the seven figures of the printing mechanism. The object of this arrangement is that if a sum total runs up into more than seven figures, a portion of this total can be set up upon the printing wheels and printed; then wiped out and the remaining figures of the sum total set up on the printing wheels and the printing roller 81 shifted longitudinally to the desired point to complete the printing of the line of figures corresponding to the sum total which is to be printed. This frame 80 is provided with a spring latch 97 intermediately pivoted at the point 98, and a spring 99 (dotted lines, Fig. 6) serves to hold the lower end of this latch in a notch 100 cut in the shaft 79, and thus serves to hold the printing roll in the position shown in Fig. 1. By pressing inward upon the upper end 101 of this latch, and releasing its lower end from the notch 100, the printing roll can be moved longitudinally for the purpose just described.

The means thus far described for working the printing roll is automatically actuated by the operating handle 5. Provision is made, however, for working the printing roll independently of the operating handle 5, so that if it is desired to print without registering the amount printed this can be done. The means for accomplishing this consists in providing an arm 102, (Figs. 2 and 6) which is secured to the end of the shaft 79 opposite the arm 78, so that by depressing the arm 102 by means of a bell-crank handle 103 (Figs. 1, 2, 5 and 6) the printing frame and its printing roll can be reciprocated for printing. It is also desirable to be able to register figures without printing, as for instance, multiplication, division or subtraction, and this is accomplished through the medium of the intermediate handle 104 and the link 105 which connects the handle with the shoulder link 73. By moving the handle 104 in the direction indicated by arrow in Fig. 5, the link 73 will be moved to the right so that the shoulder 77 will not engage the arm 78. In this position the registering mechanism can be operated as often as desired without in any manner affecting or operating the printing roll, and thus not recording any of the figures or amounts which are being registered.

The slotted ribbon guide 84 is carried by a U-shaped frame 83, and this frame 83 is provided with a rod 84' which passes through ears 85' so that the frame is capable of a longitudinal movement, for the purpose of moving the slotted plate 84 to a position to prevent the printing of any figures on the printing wheels, which it is desired not to print. This is accomplished by providing the lower portion of the U-shaped frame 83 with a rack-bar or teeth 106 with which an oscillating toothed segment 107 meshes. This segment is connected to a vertical shaft 108, and projecting from the upper end of this vertical shaft is an arm 109. The outer end of this arm passes loosely through a slot 110 formed in a bar 111, so that when the bar 111 is moved endwise the shaft is oscillated and the segment actuated and in turn the frame 83 is moved a distance corresponding to the distance that the segment is moved. A plurality of keys 112 are provided and these keys are furnished with holding springs 45' similar to the springs 45 of the keys 3, and co-act with the wiping out plate 46 just as do the springs 45. These keys have their stems engaging one end of the bell-crank levers 113 and the other ends of these levers are provided with forked portions 114 which embrace pins 115 projecting from the bars 111. Springs 116 are interposed below the arm of the bell-crank lever with which the stem of the key 112 engages, and serves to hold the key and the bell-crank lever in the position shown in Figs. 7 and 8. When one of these keys is depressed the bar 111 is moved in the direction indicated by arrow in Fig. 8 and the segment 107 is oscillated and thereby move the frame 83. These keys 112 will be made to move the bar 111 various distances, and this may be accomplished by constructing the levers 13 of various lengths, as shown in Fig. 15 so that they will respectively move the bar 111 different distances. That is to say, if the frame 83 is to be moved to cut out one of the figures, one of the keys will be depressed; if it is to be moved to cut out two of the figures another key will be depressed, and any desired number of keys will be provided for this purpose.

*Carrying mechanism.*—It is necessary to provide what is well known in this art as a carrying mechanism between the several numeral wheels of the registering mechanism; that is to say, from the unit wheel to the tens, from the tens to the hundreds, and so on throughout the series of numeral wheels of the registering mechanism. My improved carrying mechanism is particularly illustrated in Figs. 3, 9 and 10. This mechanism consists of the shaft 70 which carries a complete gear wheel 69, (both of which have been previously mentioned) and this gear wheel 69 is in mesh with the complete gear 68 of the operating shaft 61'. The gear 68 and 69 have the same number of teeth, so that the gear 69 is revolved once for every revolution of the operating shaft 61'. Carried by this shaft 70 are a plurality of collars $a, b, c, d, e, f$ and $g$, the collars $a, f,$ and $c$ each are provided with two pivoted carrying dogs $h$ which are pivoted between the arms $i$ which project from the collar, whereas the collars *d* to *g* inclusive are each provided with a single pivoted carrying dog *j*.

The collars *a* to *d* inclusive are made fast to the shaft 70, and the distances between the dogs carried by the collars *c*, *b* and *a* increases, as shown, so that beginning with the collar *d* (which is the central collar of the series) the dogs on the collar *c*, *b* and *a* are arranged in spiral lines one-fourth way around the shaft in two directions, the dogs forming one spiral acting to carry when the shaft 70 is revolved in one direction, as for instance, for multiplication, and when revolved in the opposite direction, the dogs of the other spiral will act in an inverse way, as for subtraction or division. The collars *e* to *g* inclusive have an oscillating movement upon the shaft 70, and one has a movement independent of the other, but having abutting or interlocking shoulders *k*, which independent movement will cause the dogs of these collars to arrange themselves in a spiral line one-fourth way around the shaft 70 when the shaft is rotated in one direction, and will arrange themselves in an opposite or intersecting spiral line when the shaft 70 is rotated in the opposite direction.

From the foregoing it will be understood that when the shaft 70 is rotated in one direction, the dogs of all these collars will arrange themselves in a spiral line with the spiral arrangement of one set of the dogs of the collars *c* to *a*, thus forming a spiral line of dogs half-way around the shaft 70 when the shaft is rotated in one direction, but when the shaft is rotated in the opposite direction the dogs of the loose collars will arrange themselves in a spiral line with the other set of dogs carried by the collars *c* to *a* inclusive, and thus form an oppositely-pitched spiral of dogs half way around the shaft 7. It is also clear that the dog of the intermediate collar *d* is at the center of and in a line with either of these spiral arrangements, and that when the shaft 70 is rotated in one direction the dogs of the said shaft will act in succession in one spiral for the carrying operation from one end of the shaft to the other, and when the shaft is rotated in the opposite direction they will operate in succession in an oppositely pitched spiral. I will now explain how these dogs serve with other elements to carry from one numeral wheel to the other, making reference particularly to Figs. 3, 9 and 10.

The intermediate toothed wheels 14, previously referred to, are journaled loosely upon the shaft *l*, and between each of these wheels 14 is arranged a longitudinally movable and rotatable shaft *m* which carries at its lower end a toothed wheel *n*, so that the wheel *n* is capable of a rotary and transverse movement. The end of the shaft *m* opposite the wheel *n* is pointed, as shown at *o*, and this pointed end is adapted to be engaged by a properly-positioned pointed stud *p* upon the under side of the numeral wheels 15. Formed in the shaft *m* at a point intermediate its ends are two grooves *q*, and adapted to engage with these grooves is a spring-held pointed pin *r* which pin is thus adapted to catch the shaft in these two grooves, but engages it gently so that the shaft can be moved to cause the pin to engage either groove.

The operation of these carrying devices is as follows:—It has been previously explained that the gear 64 is a segmental gear, and causes a complete rotation of the shaft 6 for every half revolution of the gear 64. In the operation the shaft 6 is revolved a complete revolution, and when one of the pointed projections *p* of any one of the wheels 15 has been caused to engage the pointed end of the shaft *m*, and has forced it into the position shown in Fig. 3, the pivoted carrying dog located below the wheel *n* of this depressed shaft *m* will have its toothed portion *s* enter between the teeth of the wheel *n*, and as it causes the wheel *n* to revolve the dog will be forced laterally to cause its toothed portion to engage one of the teeth of the succeeding wheel 14, and thus cause that wheel to revolve one tooth, and this wheel 14 in turn will cause the intermeshing numeral wheel 15 to rotate one tooth, and thus carry from one numeral wheel to the succeeding numeral wheel, as is required in such mechanism, which is well understood by those skilled in the art.

It will be understood of course that the carrying is not effected upon the numeral wheel which actuates the shaft *m*, but is effected upon the succeeding numeral wheel. In the rotation of the shaft 70 the toothed portion *s* is carried into engagement with the teeth of the wheel *n*, and the rotation further accomplishes the returning or pushing upward of the shaft *m* by reason of the shoulder *t* on the dog engaging the under side of the wheel *n*, since the axis of the shaft 70 is beyond or to the right (Fig. 3) of the axis of the shaft *m*, and the shaft *m* and its parts are thus returned to position to be again depressed by the projection upon the numeral wheel when it again reaches the shaft *m* and is in the position to require the carrying from that wheel to the succeeding numeral wheel.

As shown in Fig. 3, the carrying dogs are arranged wholly upon one side of the axis of the shaft 70, and they are arranged upon the side of the shaft 70, which corresponds to the non-toothed or smooth portion of the gear wheel 64, which is carried by the operating shaft 61', so that the shaft 6 is caused to have a complete rotation, and to cause the required movement of the registering mechanism, and is at rest during the time that the carrying mechanism is being operated, or during the time the carrying mechanism is brought into operation.

To prevent the throwing over or throwing past of the intermediate wheels 14 there is provided for each wheel a separate light spring-pressed roller $u$ which engages with the teeth of these wheels, as shown in Fig. 3.

In addition to the series of numeral wheels 15 upon which is registered the calculation, I provide a second series of registering numeral wheels 120 which are located in the carriage 2, and these wheels are for the purpose of registering the number of turns of the handle 5 in each position of the shifting case, and are useful only for multiplication showing the multiplier and in division showing the quotient. The sum total is shown on wheels 15 which, after an operation is completed, can be set up and printed as has been described.

The operation of multiplication and division are performed by shifting the case carrying the registering mechanism from place to place, as is usual in machines of this class.

The object of my invention is to provide a recording machine that is capable of subtracting a given number from a total, as readily as it can be added, combined with a calculating machine whose operation can be more rapidly performed and the results printed for future reference.

Having thus described my invention, what I claim and desire to secure by Letters Patent, is:—

1. A calculating machine comprising a registering mechanism and a recording mechanism, including printing wheels and principal actuating wheels constructed to be moved in one direction for even numbers and in the opposite direction for odd numbers starting from common central points, and means for actuating said wheels in opposite directions for the purpose specified.

2. A machine of the character described comprising a registering mechanism which includes a plurality of numeral wheels, a primary rotatable and laterally-movable calculating wheel, a wheel intermediate the numeral wheel and primary calculating wheel and adapted to mesh with both primary calculating wheels having different widths of teeth arranged on opposite sides of a circumferential space, means for holding the wheels with the circumferential space opposite the intermediate wheels, and means for independently moving these primary wheels laterally in both directions to bring one or more teeth in line with the intermediate wheels, and means adapted to rotate the primary wheels as and for the purpose described.

3. A machine of the character described, comprising a registering mechanism which includes a plurality of numeral wheels, a primary rotatable and laterally-movable calculating wheel for each numeral wheel, an intermediate wheel adapted to mesh with both the primary and the numeral wheels, the primary wheels provided with a plurality of different widths of teeth arranged at the side of a neutral or untoothed portion, means for holding the primary wheels normally with the neutral or untoothed portion in a line with the intermediate wheels, and means for moving the primary wheels laterally various distances for the purpose described, and means for rotating the primary wheels, the parts coöperating substantially as and for the purpose set forth.

4. A mechanism of the character described, comprising a registering mechanism which includes a plurality of numeral wheels, an intermediate wheel for each numeral wheel adapted to mesh therewith, a rotatable and laterally-movable primary wheel for each intermediate wheel, the primary wheels having different widths of teeth arranged at the side of a neutral or untoothed point or portion, a horizontally-arranged swinging bar operatively connected with each of the primary wheels, and a plurality of keys for moving the swinging bar different distances and thus moving the primary wheel laterally corresponding distances for the purpose described, and means for rotating the primary wheels.

5. A machine of the character described comprising a plurality of numeral wheels, an intermediate wheel for each numeral wheel, and adapted to mesh therewith, a rotatable and laterally-movable primary wheel for each intermediate wheel, the primary wheels having different widths of teeth arranged at the side of a neutral or untoothed point or portion thereof for the purpose described, an elongated swinging bar operatively connected with each of the primary wheels for moving them laterally, and a plurality of keys for moving the swinging bar different distances, and thus moving its primary wheel laterally corresponding distances for the purpose described, and means for rotating the primary wheels.

6. A machine of the character described comprising a registering mechanism including a plurality of numeral wheels, an intermediate wheel for each numeral wheel, a primary calculating wheel for each intermediate wheel, the primary wheel provided with different widths of teeth on the side of a neutral or untoothed point or portion, an elongated swinging bar operatively connected with each of the primary wheels and adapted to move them laterally, a plurality of keys arranged along a line at the side of the said bar, the stems of the keys and the said bar constructed to cause the depression of the several keys to individually move or swing the bar different distances for moving the primary wheel laterally corresponding distances for the purpose described, and means for rotating the primary wheels.

7. A machine of the character described, comprising a plurality of numeral wheels, an intermediate wheel for each numeral wheel, a primary calculating wheel for each intermediate wheel, an elongated laterally-movable bar for each primary wheel and operatively connected therewith to move it laterally when the bar is swung, the primary wheels having different widths of teeth at opposite sides of a circumferential untoothed space, a series of keys arranged with their stems in lines at opposite sides of the laterally-movable bar, the sides of the bar tapered from one end to the other and the adjacent sides of the key stems beveled and adapted to engage respectively the adjacent sides of the laterally-movable bar as and for the purpose described, and means for rotating the primary wheels.

8. A machine of the character described, comprising a registering mechanism which includes a plurality of wheels, one of which is a primary calculating wheel, a laterally movable elongated bar operatively connected with the primary wheel by moving it to a set up position, a plurality of keys having their stems adapted to move the said bar laterally when the keys are depressed, and means for holding and releasing the keys from their depressed position, and means for rotating the primary wheels while the keys are held in their depressed position.

9. A machine of the character described, comprising a registering mechanism which includes primary or setting up calculating wheels, a printing mechanism including a plurality of printing wheels, a laterally-movable bar for each primary and printing wheel, and means connecting each of these bars with one of the primary wheels and with one of the printing wheels, and a plurality of keys for each bar and adapted to move it various distances as and for the purpose described.

10. A machine of the character described, including a plurality of numeral wheels, intermediate wheels adapted to register therewith, a rotatable and laterally-movable primary wheel for each intermediate wheel, a printing mechanism comprising a plurality of oscillating printing wheels, a laterally-movable bar for each primary wheel and each printing wheel, the printing wheels carrying pinions, a rack-bar meshing with the pinions and connected with the laterally-movable bar, and an operative connection between the laterally-movable bar and the primary wheel, and means for rotating the primary wheels and actuating the printing mechanism.

11. A machine of the character described, comprising a registering mechanism which includes a plurality of numeral wheels, a plurality of intermediate wheels adapted to mesh therewith, a shaft carrying a plurality of primary or set up calculating wheels, means for setting up the calculating wheels, the said shaft having a gear, a shaft provided with a carrying mechanism for the intermediate wheels, the shaft provided with a gear having twice the number of teeth of the gear on the primary wheel shaft, and an operative mechanism having a complete gear of the same number of teeth as the gear of the carrying mechanism shaft and in mesh therewith, and an operating member rotating in unison with the two last mentioned gears and having a segmental gear adapted to operate the gear on the primary shaft during only one half of its revolution, the carrying mechanism so located as to be brought in operation when the primary wheel shaft is at rest.

12. A carrying mechanism for calculating machines, comprising a plurality of independent gears 14, a plurality of numeral wheels adapted to mesh therewith, and carrying devices for each wheel 14 comprising an endwise movable and rotatable toothed member $n$, a shaft extending parallel to the axes of the gears 14, and carrying pivoted shouldered dogs adapted to engage the toothed member $n$ and rotate it and to be carried laterally by the toothed member $n$ into engagement with the succeeding gear 14 and cause it to rotate one notch or tooth, the numeral wheels provided with means for moving the member $n$ laterally once during each revolution thereof.

13. A carrying mechanism for calculating machines comprising a plurality of independent gears 14, a plurality of independent numeral wheels adapted to mesh therewith, and carrying devices for each wheel 14 comprising a rotatable and endwise movable shaft $m$ located between the wheels 14, one end of the shaft carrying a toothed member and the other end of the shaft beveled, a shaft extending longitudinal the axes of the wheels 14, the shaft carrying dogs adapted to respectively actuate the toothed member $n$, the said dogs being pivoted and shouldered, the shoulders adapted to engage the toothed member $n$ and cause it to rotate and the toothed member adapted to move the dog laterally in engagement with the adjacent wheel 14 and cause it to rotate one tooth, each of the numeral wheels provided with a projection adapted to engage the beveled portion of the shaft $m$ and to move it endwise in line with the travel of the said carrying dogs.

14. A carrying mechanism for calculating machines comprising a plurality of numeral wheels, a plurality of wheels 14 in mesh therewith, carrying members located between the wheels 14, a shaft extending longitudinal the axes of the wheels 14, the shaft carrying a central carrying dog, and at one side of this carrying dog is provided with several pairs of carrying dogs arranged in a spiral relation with the central dog, and a plurality of carrying dogs at the opposite side of the central dog which are arranged to have a limited lateral movement around the shaft to cause them to arrange themselves in a spiral line with the central dog and with one series of the pairs of dogs when the shaft is revolved in one direction, and to arrange themselves in an opposite spiral with the central dog and with the other series of dogs of the said pairs, the parts constructed and arranged to operate as and for the purpose described.

In testimony whereof I affix my signature in presence of two witnesses.

FRANK S. BALDWIN.

Witnesses:
LAWRENCE BOND,
HARRY B. ALDRICH.